US012352497B1

(12) United States Patent
Shephard

(10) Patent No.: US 12,352,497 B1
(45) Date of Patent: Jul. 8, 2025

(54) ELECTRIC EYEWEAR LENS AND FRAME DRYER

(71) Applicant: Christopher Allen Shephard, Georgetown, TX (US)

(72) Inventor: Christopher Allen Shephard, Georgetown, TX (US)

(73) Assignee: Christopher Allen Shephard, Lometa, TX (US)

( * ) Notice: Subject to any disclaimer, the term of this patent is extended or adjusted under 35 U.S.C. 154(b) by 520 days.

(21) Appl. No.: 17/896,070

(22) Filed: Aug. 25, 2022

Related U.S. Application Data

(60) Provisional application No. 63/236,839, filed on Aug. 25, 2021.

(51) Int. Cl.
*F26B 3/04* (2006.01)
*A45C 11/04* (2006.01)
*A45C 15/00* (2006.01)

(52) U.S. Cl.
CPC ................ *F26B 3/04* (2013.01); *A45C 11/04* (2013.01); *A45C 15/00* (2013.01)

(58) Field of Classification Search
CPC ............. F26B 3/04; A45C 11/04; A45C 15/00
USPC ........................................................ 34/604, 90
See application file for complete search history.

(56) References Cited

U.S. PATENT DOCUMENTS

| | | | | | |
|---|---|---|---|---|---|
| 1,261,502 | A * | 4/1918 | Farrows | B43K 7/12 | 401/196 |
| 3,406,696 | A * | 10/1968 | MacChesney | G02C 13/006 | 15/310 |
| 3,480,022 | A * | 11/1969 | Richardson | G02C 13/006 | 134/135 |
| 5,143,101 | A * | 9/1992 | Mor | G02C 13/006 | 134/108 |
| 5,890,503 | A * | 4/1999 | Bowen | B08B 3/102 | 134/201 |
| 5,899,001 | A * | 5/1999 | Layton | F26B 21/02 | 219/400 |
| 6,170,651 | B1 * | 1/2001 | Taormina | A45C 11/043 | 206/229 |
| 10,722,403 | B2 * | 7/2020 | Saladino | A61F 9/029 | |
| 11,679,287 | B2 * | 6/2023 | Yu | A61M 16/0069 | 128/200.28 |
| 12,093,077 | B1 * | 9/2024 | Kubo | G02B 7/02 | |
| 2019/0059562 | A1 * | 2/2019 | Escava | A45F 3/20 | |
| 2023/0248994 | A1 * | 8/2023 | Shavit | A61H 23/02 | 601/18 |

FOREIGN PATENT DOCUMENTS

| | | | |
|---|---|---|---|
| CA | 2921689 | A1 * | 9/2017 |
| KR | 2023036637 | A * | 3/2023 |

* cited by examiner

*Primary Examiner* — Stephen M Gravini

(57) ABSTRACT

An electric eyewear lens and frame dryer is disclosed. This invention removes the human element from drying eyewear frames and lenses. It removes the concern of scratching and damaging lenses by improperly drying the lenses, as well as the difficulties of having to carry around special lint free cloths. The invention is small, portable, convenient and safe for your eyewear.

1 Claim, 2 Drawing Sheets

ELECTRIC EYEWEAR LENS AND FRAME DRYER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Problem Solved: Cleaning eyewear smudge and streak free is a pain. Using existing methods such as pre-moistened lens wipes leave smudges and streaks. Other methods such as lint free towels and gadgets with microfiber disks don't work. This makes getting a perfectly clean clear streak free lens near impossible.

Existing methods and gadgets for drying eyewear lenses simply do not work, leaving streaks, smudges, and can damage and scratch lenses.

BRIEF SUMMARY OF THE INVENTION

This invention removes the human element from drying eyewear frames and lenses. It removes the concern of scratching and damaging lenses by improperly drying the lenses, as well as the difficulties of having special lint free cloths. The invention is small, portable, convenient and safe for your eyewear.

DETAILED DESCRIPTION OF THE INVENTION

As stated above, cleaning eyewear smudge and streak free is a pain. Using existing methods such as pre-moistened lens wipes leave smudges and streaks. Other methods such as lint free towels and gadgets with microfiber disks don't work. This makes getting a perfectly clean clear streak free lens near impossible. The invention claimed here solves this problem.

This electric powered eyewear dryer quickly and hands free dries lenses and frames leaving eyewear perfectly clean and streak free.

The claimed invention differs from what currently exists. There are no similar inventions to date. Previous means of drying eyewear leave lenses streaky with smudges and even scratches. This invention removes the need to physically touch the eyewear when drying the frames and lenses which solves previous drying methods that leave streaks, smudges and scratches.

This invention is an improvement on what currently exists. There are no similar inventions to date. Previous means of drying eyewear leave lenses streaky with smudges and even scratches. This invention removes the need to physically touch the eyewear when drying the frames and lenses which solves previous drying methods that leave streaks, smudges and scratches.

Simply put, human contact is needed with existing eyewear lens drying methods. Human's oily skin and fingers ultimately touch the lenses leaving greasy streaks and potentially scratching and damaging lenses. Pre-moistened lens wipes leave streaks and don't work. Most people use a T-shirt or towel which can cause damage and scratches to the lenses.

This invention removes the human element from drying eyewear frames and lenses. It removes the concern of scratching and damaging lenses by improperly drying the lenses, as well as the difficulties of having special lint free cloths. The invention is small, portable, convenient and safe for your eyewear.

1. Vented container with hinged lid that can accommodate multiple sizes of eyewear.
2. Hinges that attach the lid to the container so that lid can be opened and closed without being completely removed.
3. Ventilation hole in the roof of the lid for heat dissipation.
4. Display for selecting time that the auto dry cycle will run for and then automatically shut off.
5. Button for selecting the time that the auto dry cycle will run for and then automatically shut off.
6. Button to release the catch and to open the lid.
7. Button for starting the eyewear lens and frame drying process.
8. Lid that covers the container during the drying process.

FIG. 2/2 DRAWING DESCRIPTION

1. Vented container with hinged lid that can accommodate multiple sizes of eyewear.
2. Hinges that attach the lid to the container so that lid can be opened and closed without being completely removed.
3. Ventilation hole in the roof of the lid for heat dissipation.
8. Lid that covers the container during the drying process.
9. Latch to catch when shutting lid to prevent the lid from opening during the drying process.
10. Catch to engage with the latch when shutting the lid to prevent the lid from opening during the drying process.
11. Raised support block to slightly elevate and support the temple section of the eyewear frame.
12. High velocity mini fans, 2 that reside in front of the lenses, 2 that reside on the back side of the lenses and 2 placed near the rear inside temples of the eyeware.
13. DC current power source to power fans, heat source, sensors as well as recharge portable power source such as rechargeable batteries.

14 Raised nose shaped support block for the nose bridge of the eyewear to rest on.

15. Low temperature heat source if needed.
16. Block housing to mount and hide circuitry, heat source, sensors, portable power such as rechargeable batteries.

Figure 1:
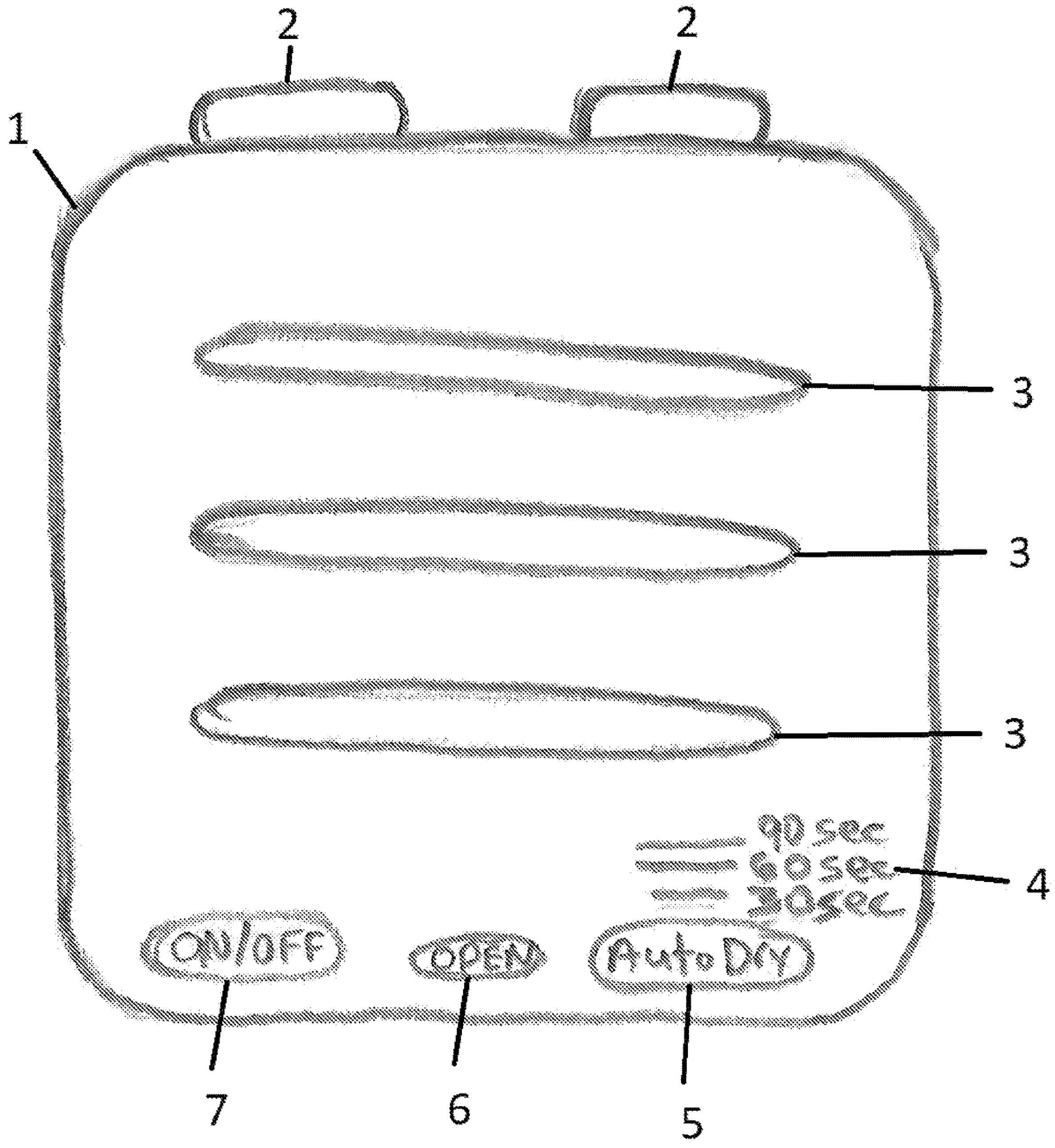
FIG. 1/2 DRAWING DESCRIPTION

Relationship Between the Components Drawing FIG. 1/2

(1) The vented lid will contain a (6) button or latch for opening and closing the lid of the container. (7) A switch or button will turn on and off power to the device and start and stop the drying process.

Figure 2:
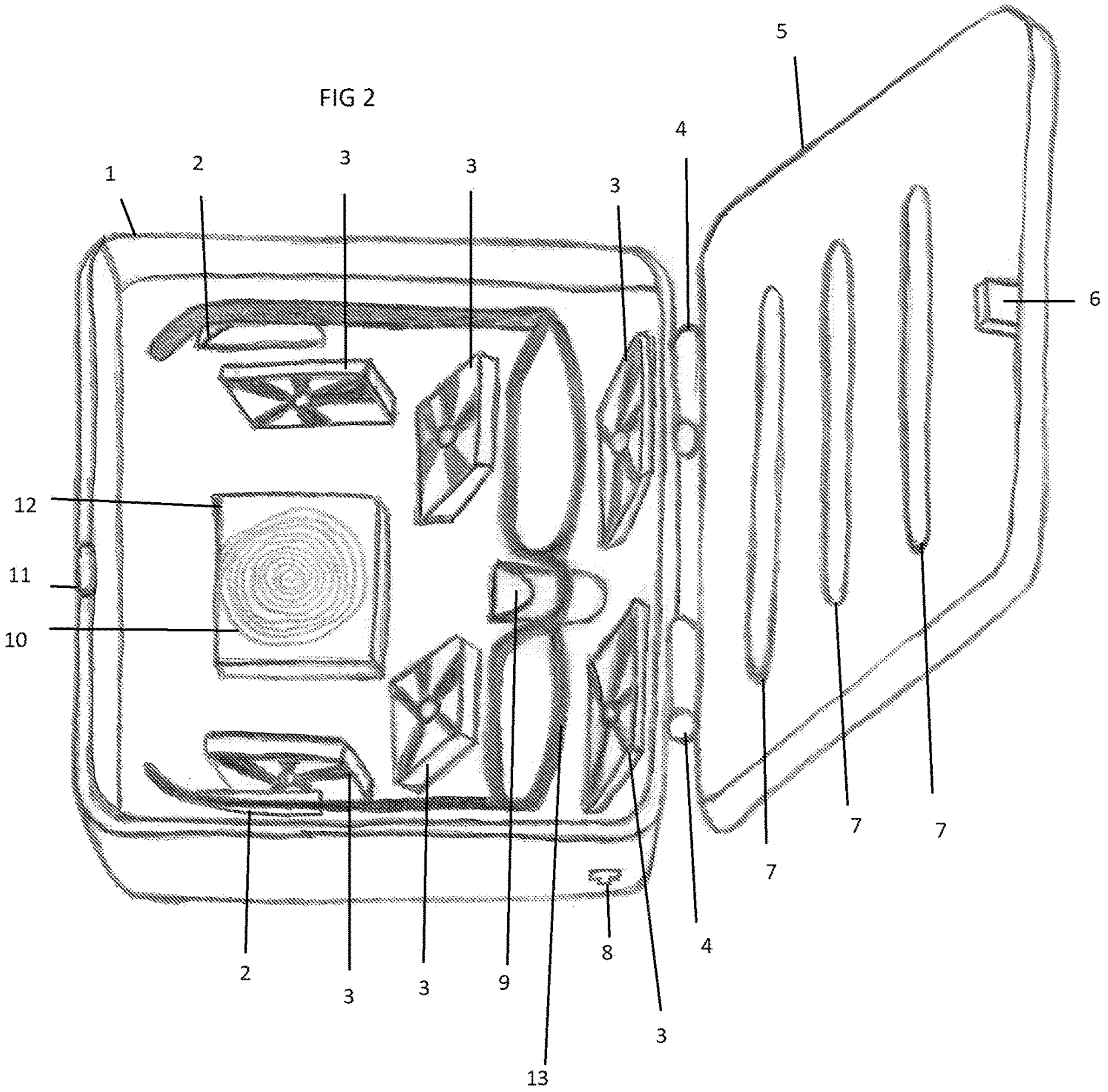

Relationship Between the Components Drawing FIG. 2/2

(1) The vented container will have (2) spring-loaded hinges when opened will assist in opening the lid. (3) The vent holes in the lid will create a convection for optimum air flow and drying. (14) Nose shaped bridge support and (11) temple supports will raise eyewear off the bottom of the (1) container to properly position lenses, frames and fans for optimum air flow and drying. (12) Mini high velocity fans will be placed throughout the container, one in front of each eyewear lens, one behind each lens, minimum of four fans, others can be placed on both sides of the eyewear temples as well. The fans can be adjustable in height and angled to achieve optimum air direction and flow. (15) A low temperature heat source is housed in the center of the container between the lenses and temples of the eyewear to help dry the eyewear quickly. (13) A power source will be needed to run the fans and heat source. This can be a USB interface accepting DC current, rechargeable batteries, or both. (16) Controller logic and sensors can be used to automatically turn off power to the mini fans and (15) low temperature heat source. (16) Moisture sensors will be used to detect the dryness level and shut the device off in auto mode or selectable timed logic for example 30, 60, 90 second selection.

How the Invention Works

A user would open the container. The eyewear is placed into the container on the designed nose bridge and temple mounts. Once the lid is shut and power is applied to the high velocity mini fans and low temperature heat source the warm air is powerfully circulated within the container as well as directly onto the lenses of the eyewear quickly drying the lenses and frames resulting in clean clear spot free lenses. (13) Automatic shut off could be achieved by adding a moisture sensor and controller logic so that if a certain level of moisture is detected power to the (12) the mini fans and (15) low temperature heat source can be turned off. (13) Automatic shut off can also be achieved by adding a controller and timed logic using a switch or button to select predetermined time amounts such as 30, 60, 90 seconds, which when the time is exhausted power to the (12) the mini fans and (15) low temperature heat source can be turned off.

How to Make the Invention

The vented container will need to be 3D printed or molded and manufactured with the nose bridge and temple supports as well as mounts for the mini fans, low temperature heat source, moisture sensor, time selection switch, controller, power source and on/off switch. Install mini fans, low temperature heat source, moisture sensor, time selection switch, controller, power source and on/off switch. Wire mini fans, low temperature heat source, moisture sensor, time selection switch, controller, power source and on/off switch.

The vented container, minimum of 4 mini fans, power source and on/off switch would be necessary for the invention to function. The low temperature heat source, moisture sensor, time selection switch, controller would make the invention better. Additional mini fans for drying the rest of the eyewear frame and temples could be optional. It might be possible to reconfigure the position of the mini fans onto the lid and floor of the container to achieve similar functionality.

How to Use the Invention

Properly clean and wash eyewear by washing and drying your hands. Before cleaning your eyewear, wash your hands thoroughly. Use lotion-free soap or dishwashing liquid and a clean, lint-free towel. Rinse your eyewear under a gentle stream of tap water. This will remove dust and other debris, which can help avoid scratching your lenses when you're cleaning them. Avoid hot water, which can damage some eyewear lens coatings. Apply a small drop of lotion-free dishwashing liquid to each lens. Most dishwashing liquids are very concentrated, so use only a tiny amount or apply a drop or two to your fingertips before touching the lenses. Use only lotion-free brands. Gently rub both sides of the lenses and all parts of the frame. Make sure you clean every part of your glasses, including the nose pads and the temples of the frame. Clean the area where the edge of the lenses meets the frame as dust, debris and skin oils frequently accumulate here. Rinse both sides of the lenses and the frame. Failing to remove all traces of soap will cause the lenses to be smeared when you dry them. Gently shake your glasses to get rid of most of the water on the lenses. Inspect the lenses carefully to make sure they are clean. Open the lid of the container to the Quick Lens Dryer by using the button or latch. Place eyewear on the nose bridge evenly spaced between the four lens fans and rest the temples on the temple supports. Close the container lid. Press the power button to turn on power to the mini fans and low temperature heat source. Wait for the eyewear lenses and frames to dry. Once they are dry turn the power button off or if auto shut off is enabled the device will shut off automatically. Once the device is off, open the container lid by pressing the open button or latch. Remove eyewear for crystal clear spot free lenses and dry frames.

Additionally

It can be used to dry all types of eyewear such as sunglasses, prescription glasses, safety glasses, goggles for swimming, snow skiing, dirt biking, skydiving, any type of eyewear. It's possible it could be used to dry small electronic screens such as cell phones or tablets. Could be used to dry jewelry such as rings, watches, necklaces, earrings. Could be used to dry collectibles such as coins and precious metals.

The invention claimed is:

1. An electric eyewear lens and frame dryer comprising:
a vented container and hinged lid;
a power source;
a heat source;
a moisture sensor;
controller module;
one or more high velocity fans;
method of displaying visual feedback to a user and accepting input from a user;
wherein the power source, sensors and controller module provide instructions to control the high velocity fans and heat source for drying the eyewear lenses and frames.

* * * * *